April 10, 1951     B. N. FISHER     2,548,713

INSULATED MULTISECTION CONDENSER ROTOR SHAFT

Filed April 4, 1946

INVENTOR
BERNE N. FISHER

BY *James & Franklin*

ATTORNEYS

Patented Apr. 10, 1951

2,548,713

UNITED STATES PATENT OFFICE 2,548,713

INSULATED MULTISECTION CONDENSER ROTOR SHAFT

Berne N. Fisher, New York, N. Y., assignor to General Instrument Corporation, Elizabeth, N. J., a corporation of New Jersey Application April 4, 1946, Serial No. 659,459

12 Claims. (Cl. 174—138)

This invention relates to the manufacture of a multi-section variable condenser rotor shaft, the sections of which are insulated one from the other, and to a condenser construction embodying the same.

Connection to the rotor sections of conventional variable radio condensers is ordinarily made by means of wipers which make simultaneous contact with the rotor shaft and the condenser frame, the frame in turn being connected to any desired part of the receiving circuit, generally to ground. At ordinary frequencies the impedance from one condenser section to the next via the frame is considerably higher than the impedance from the wiper to ground, and consequently, the above described conventional connection method is workable. However, as the frequency of the received transmission increases, and particularly when it enters that frequency band currently used for frequency modulation transmission, the section to section impedance via the frame decreases to a point where, if conventional connection methods are employed, undesirable coupling effects occur between sections.

It is consequently necessary in such applications that the rotor shaft be insulated from the frame and that the various rotor shaft sections be at the same time insulated from one another, yet simultaneously rotatable, in order that operation of a single tuning control will effect tuning of the various circuits in the receiver in the manner conventionally known as "gang tuning."

At the same time the standard desiderata of conventional rotary variable condensers must be attained. The more important of these desiderata are the following:

1. The mechanical stresses in the condenser frame and the reacting stresses on the rotor unit rotatably mounted in the frame must be eliminated, and a smooth and "no play" rotor operation must be produced. This desideratum has already largely been solved by special ball bearing mountings in prior art condenser construction practice, and this type of mounting is substantially employed, but with suitable variations, in my present invention.

2. The rotor unit must be so constructed that the condenser plates carried thereby accurately interleave with the stator condenser plates and are rotatable therebetween so that accurate tuning may be attained. To achieve this result it is essential that the several rotor shaft sections be axially aligned, that they maintain their axial alignment throughout their entire freedom of rotation, and that the rotor plates be absolutely at right angles to the axis of rotation of the rotor so as to travel through the same plane throughout the rotation of the rotor.

3. These desiderata must be satisfied in such a way that the condensers, whether they be of single or multiple gang type, and whether they be of low maximum or high maximum capacity, may be manufactured by quantity production methods.

Co-pending application Serial No. 566,533, filed December 4, 1945, now abandoned, and owned by the assignee of my invention, discloses one means of accomplishing the above desiderata involving the use of a single rotor shaft made of an insulating material. The present invention achieves the same results as the previous application, but in a manner at once much more inexpensive and much more adaptable to mass production, by employing a sectionalized metal rotor shaft.

It is the prime object of the present invention to provide a rotor shaft for a multi-section variable condenser, the sections of which shaft are insulated one from the other, but are simultaneously rotatable.

Another object of the present invention is to provide such a shaft which may be easily and conveniently assembled in a variable condenser of standard construction.

It is yet another object of the present invention to provide such a shaft which may be conveniently and simply insulated from the condenser frame.

Still another object of the present invention is to provide such a shaft which achieves the above mentioned desiderata.

It is a further object of the present invention to provide a multi-section variable condenser, the rotor sections of which are insulated one from the other and each from the frame but are simultaneously rotatable, the condenser thus being adapted for ultra-high-frequency reception.

To the accomplishment of these objects and such other objects as may hereinafter appear, my present invention is directed to a multi-section rotor shaft, the sections of which are insulated one from the other but may be simultaneously rotated, and to a variable condenser embodying such a shaft, as particularly sought to be defined in the appended claims and described in the following specifications taken together with the appended drawings, in which:

Figure 1:
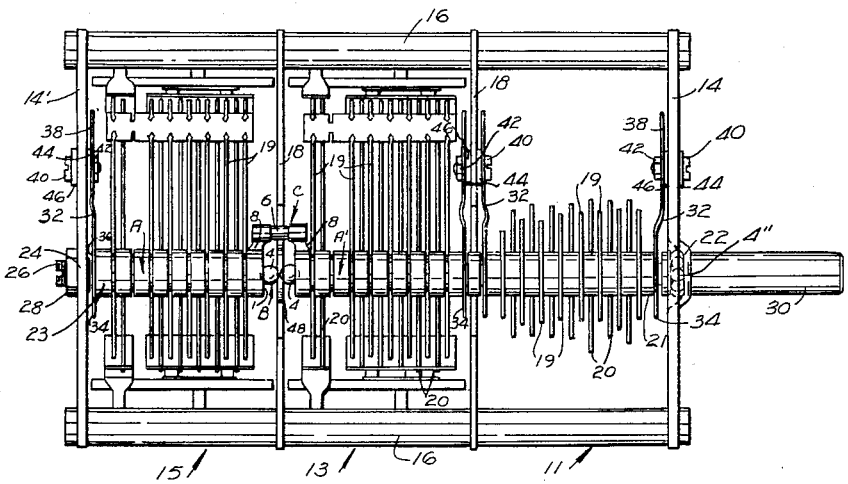
Fig. 1 is a top view of one embodiment of a multi-section condenser employing my invention, two of the sections of which are conventionally and non-insulatedly connected, and two of the sections of which are connected according to my invention.
Figure 2:
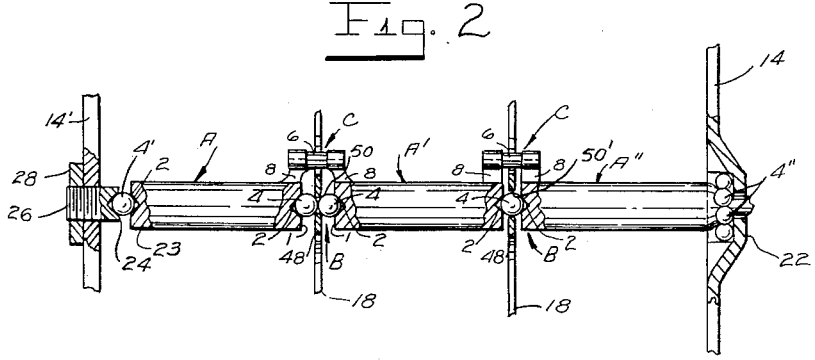
Fig. 2 is a top view of the rotor shaft of my invention, shown without rotor plates, in a condenser frame, illustrating two alternative means of connecting the shaft sections and mounting the same in the condenser frame.

The rotor shaft of my invention comprises a plurality of axially aligned shaft sections such as A and A' of Fig. 1, and A, A' and A'' of Fig. 2, which may be made of any conventional conductive material, such as aluminum. Between the sections, and more particularly between the adjacent or opposing end of each pair of these sections, is a bearing means generally designated as B and made of insulating material, and connecting the adjacent or opposing ends of such sections is a connecting means generally designated as C and also composed of insulating material, the bearing means B and the connecting means C being so disposed with respect to the shaft sections which they join that the shaft sections are simultaneously rotatable but are insulated one from the other.

Figure 3:
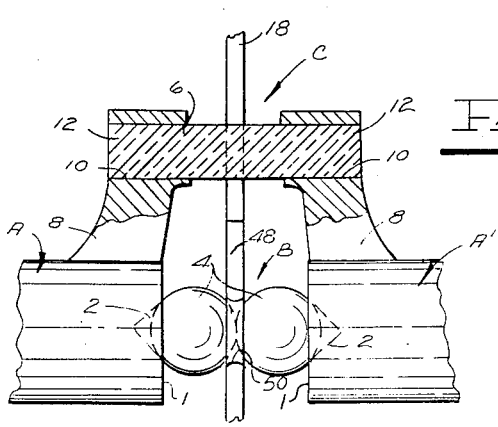
Fig. 3 is a view on an enlarged scale, partially cross-sectioned, of one means for connecting two shaft sections.

In order to facilitate the axial alignment of the shaft sections A, A', A'', the adjacent ends 1 of those sections, that is, the ends opposing or facing one another, are provided with bearing seats 2 (see Figs. 2 and 3), here shown as axially aligned conical seats adapted to receive therein ball bearings 4 composed of glass, ceramic, or other suitable insulating means. If the seats 2 are accurately formed in conical shape and if they are accurately positioned on the shaft section ends with respect to the rotational axes thereof, the seats 2 and the balls 4 will be self-aligning, that is to say, as the shaft sections A and A' (Fig. 1) or A, A', and A'' (Fig. 2) are pressed toward one another, the balls 4 seating themselves in the seats 2 will tend to maintain the axial alignment of the shaft sections, and at the same time will provide a non-conductive bearing connection between the sections.

In order that rotation of one of the shaft sections of a pair may be imparted to the other shaft section of the pair for simultaneous rotation, the connecting means C may comprise a link or bar 6 of insulating material radially offset from the axis of the shaft sections and connected thereto. The member 6 may be more specifically formed either of glass or of insulating materials such as are marketed under the names of "Steatite" and "Mycalex," all of which I have found to be suitable for the purpose.

In order to facilitate the connection, I have provided on the end 1 of each shaft section A and A' of Fig. 1 and A, A' and A'' of Fig. 2 which is to be coupled to an adjoining shaft section a radially extending arm 8, either formed integrally with the shaft section or attached thereto by any suitable means such as welding or soldering. The projecting ends of these radial arms 8 are provided with apertures 10 adapted to receive therein the ends 12 of the insulating link 6. These ends 12 may be joined to the arms 8 by staking or the ends, metallized prior to insertion into the openings 10, may be joined to the arms 8 by soldering after insertion.

From the above description it will be apparent that the several rotor shaft sections such as A and A' of Fig. 1 or A, A' and A'' of Fig. 2 will be connected together in axial alignment, but will be insulated one from the other, and rotation imparted to one shaft section will be simultaneously transmitted to the other shaft section or sections.

Fig. 1 discloses a three-section variable condenser embodying a composite shaft as above described in which the central and right hand rotor sections 11 and 13 are non-insulatedly connected together, the left hand section 15 being insulatedly connected thereto according to the present invention, and the entire rotor assembly is insulated from the condenser frame.

The condenser frame comprises end plates 14, 14', longitudinally extending bars 16 connecting the same, and metal intermediate plates 18 separating the sections and acting as shields therebetween. Attached to the frame in spaced relation in customary manner are a plurality of stator plates 20 forming stator plate sections or units. The metal rotor shaft comprising the separate shaft sections A and A', each carrying rotor plates 19, arranged to form rotor plate sections or units, is mounted in the condenser frame for rotation therein, the front shaft section A' resting at its outer end 21 in front bearing 22 in end plate 14, and the rear shaft section A resting at its outer end 23 in rear bearing 24 in end plate 14'. The front and rear bearings 22 and 24 are of conventional rotary variable condenser design, except that the bearing balls 4', 4'' therein are formed of an insulating material. The rear bearing 24 is of the conventional adjustable thrust type, the adjustability being attained by the rotation of screw 26 in end plate 14', through which it is threaded, and the thrust being attained by the pressure of screw 26 on bearing ball 4'. Lock nut 28 serves to adjustably lock the screw 26 to the end plate 14'.

Projecting forwardly through the front bearing 22 is the condenser control shaft 30, which may be formed integrally with rotor shaft section A', and to which may be attached a tuning knob (not shown) for purposes of controlling the rotation of the condenser.

In order to connect the various rotor sections to the appropriate parts of the receiving circuit, conventional wipers 32 are employed, one end 34 thereof bearing against shoulder 36 at the end of the shaft, and the other end 38 thereof being fastened either to the end plate 14, 14' or to an intermediate plate 18 by means of screw 40 and bolt 42, but insulated therefrom by insulating washers 44 and 46. Suitable low impedance leads (not shown) connect the wipers 32 to their appropriate positions in the receiving circuit.

In order to assist in the assembly of the condenser and in the maintenance of axial alignment between the shaft sections A and A' of Fig. 1 and A, A' and A'' of Fig. 2, the intermediate plates 18 between those rotor sections to be insulatedly connected have a portion 48 thereof intersecting the common axis of the rotor shaft sections, the portion 48 being appropriately provided with an aperture 50 (see Figs. 2 and 3), so placed as to coincide with the common axis of the rotor shaft sections and so dimensioned as to support therein the bearings 4. Fig. 2 discloses two embodiments of the bearing means, the left hand embodiment employing two ball bearings 4, and the right hand embodiment employing only a single ball bearing 4. It will be noted that the aperture 50 adapted to receive the two ball bearings 4 is smaller in diameter than the aperture 50' adapted to receive only a single ball bearing 4, since only a small portion of the bearing balls 4 will be received into the aperture 50, whereas the full diameter of the single ball bearing will be received into the aperture 50'.

The remainder of the intermediate plates 18 are so shaped as to permit the link 6 to rotate freely with the shaft sections about their axes. This may be accomplished by making the radius of the raised portion 48 less than the radial distance of the link 6 from the shaft axis.

The manner of assembling the condenser above described is in accordance with the conventional method of assembling of ordinary variable condensers. It will be now described with reference to the embodiment illustrated in Figs. 2 and 3.

The condenser frame is formed, and the units or sections of the stator plates 20 are insulatedly attached thereto. The balls 4'' of insulating material are then inserted in the integral front bearing 22 and the rotor shaft section A'' (Fig. 2) is put into place, the rotor plates 19 having previously been attached thereto in any conventional manner. The ball bearing 4 connecting the section A'' with the section A' is then put into place by passing ball 4 into the opening 50' from the side thereof closest to section A'. Rotor shaft section A' is next inserted so that its seat 2 engages with ball 4, rotor shaft section A'' being maintained in place by a suitable fixture. The ball bearings 4 comprising the bearing means between rotor shaft sections A' and A are then put in place, the right hand of the balls 4 being inserted by springing the portion 48 away from its normal position, and the left hand of the balls being inserted in any convenient manner from the side of the plate 18 facing section A. Rotor section A' is then held in place by a suitable fixture, and rotor section A is inserted so that the left hand ball of the bearing means between sections A and A' rests in the seat 2 of shaft section A. The end bearing insulating ball 4' is then inserted through the end plate 14' and the same rests in the corresponding seat 2 in the outer end 23 of shaft section A, and the screw 26 is screwed into end plate 14' to exert pressure on the entire rotor shaft assembly until the desired axial alignment and freedom of rotation is attained, after which the screw 26 is locked in position by lock nut 28.

The radial arms 8 on the shaft sections A and A' of Fig. 1 and A, A' and A'' of Fig. 2 are next aligned so that the openings 10 therein come into registration, the insulating links 6 are slid into those openings, and the metallized ends 12 thereof are then soldered to the radial arms 8.

It will be apparent that the above described construction and method of assembly, which is adapted to utilize insofar as possible conventional condenser elements and conventional methods of assembly and manufacture, result in a multi-section variable condenser the rotor sections of which are maintained in rigid axial alignment, are insulated one from the other and each from the frame, and yet are simultaneously rotatable by actuation of the control shaft 30. The above objectives are accomplished with a minimum use of relatively expensive insulating materials, and is characterized by extreme simplicity of construction. Precision rotor assemblies having a smooth and "no play" rotor operation are thereby produced in a manner well adapted for quantity production technique.

It will be apparent that many changes may be made in the details of construction and assembly as set forth herein, without departing from the spirit of the invention sought to be defined in the following claims.

I claim:

1. A rotor shaft for a multi-section variable condenser comprising a plurality of axially aligned shaft sections having axial ball bearing seats at their opposing ends, insulating ball bearing means between said shaft sections and in said seats, said shaft sections being pressed axially toward one another so as to retain said ball bearing means in said seats, and insulating connecting means secured to said shaft sections and extending from one to the other, whereby said shaft sections are simultaneously rotatable but are insulated one from the other.

2. A rotor shaft for a multi-section variable condenser comprising a plurality of axially aligned metal shaft sections each having at an end thereof opposite to an end of another shaft section a radially extending arm and an axial ball bearing seat, insulating ball bearing means between said shaft sections and in said seats, said shaft sections being pressed axially toward one another so as to retain said ball bearing means in said seats, and a member connecting said radially extending arms, one of said member and said arms being of insulating material whereby said sections are insulated one from the other and are simultaneously rotatable.

3. An insulating rotation-transmitting connection for two axially aligned rotor shafts comprising bearing seats in the ends of said shafts facing one another, insulating ball bearing means between said shafts and in said seats, said shafts being pressed axially toward one another so as to retain said ball bearing means in said seats, and connecting means comprising a member of insulating material offset from the common axis of said shafts and connected to each of them.

4. An insulating rotation-transmitting connection for two axially aligned rotor shafts comprising axial, self-aligning bearing seats in the ends of said shafts facing one another, insulating ball bearing means between said shafts and in said seats, said shafts being pressed axially toward one another so as to retain said ball bearing means in said seats, and connecting means comprising radially extending arms on said shafts at their opposing ends and a member of insulating material fastened to each of said arms.

5. A shaft and mounting assembly comprising a plurality of axially aligned shaft sections having axial ball bearing seats at their opposing ends, a structural element between said opposing ends, said element being apertured in line with the axis of said shaft sections, insulating ball bearing means in said bearing seats passing through said aperture and supported by said structural element, and insulating connecting means secured to said shaft sections and bridging the gap between them whereby said shaft sections are simultaneously rotatable but are insulated one from the other.

6. A shaft and mounting assembly comprising a plurality of axially aligned metal shaft sections each having at an end thereof opposite to an end of another shaft section a radially extending arm and a ball bearing seat, said seat being axially positioned with respect to said shaft section, a structural element between said opposing ends, said element being apertured in line with the axis of said shaft sections, insulating ball bearing means in said bearing seats passing through said aperture and supported by said structural element, and a member connecting said radially extending arms, one of said member and said arms being of insulating material, whereby said sections are insulated one from the other and are simultaneously rotatable.

7. The rotor shaft of claim 1, in which a single ball bearing is between said shaft sections and in the seats in the opposing ends of said sections.

8. The rotor shaft of claim 1, in which separate ball bearings are in the opposing seats of said shaft sections, pressed together by said shaft sections, in combination with a rigidly supported structural element extending between said shaft sections and having an aperture therein at the axis of said shaft sections of a size so related to said separate ball bearings as to receive a portion of each of said bearings therewithin, thus supporting said bearings in a line with said shaft sections.

9. The rotor shaft of claim 2, in which a single ball bearing is between said shaft sections and in the seats in the opposing ends of said sections.

10. The rotor shaft of claim 2, in which separate ball bearings are in the opposing seats of said shaft sections, pressed together by said shaft sections, in combination with a rigidly supported structural element extending between said shaft sections and having an aperture therein at the axis of said shaft sections of a size so related to said separate ball bearings as to receive a portion of each of said bearings therewithin, thus supporting said bearings in a line with said shaft sections.

11. In combination with the rotor shaft of claim 7, a rigidly supported structural element extending between said shaft sections and having an aperture therein at the axis of said shaft sections, said single ball bearing being received within said aperture and extending out on either side thereof so as to be received within said seats.

12. In combination with the rotor shaft of claim 10, a rigidly supported structural element extending between said shaft sections and having an aperture therein at the axis of said shaft sections, said single ball bearing being received within said aperture and extending out on either side thereof so as to be received within said seats.

BERNE N. FISHER.

REFERENCES CITED

The following references are of record in the file of this patent:

UNITED STATES PATENTS

| Number | Name | Date |
| --- | --- | --- |
| 1,632,878 | Bremer | June 21, 1927 |
| 1,702,833 | Lemmon | Feb. 19, 1929 |
| 1,844,839 | Buttolph | Feb. 9, 1932 |
| 1,934,907 | Behringer | Nov. 14, 1933 |
| 1,972,510 | Antonietta | Sept. 4, 1934 |
| 2,394,947 | Stephens | Feb. 12, 1946 |

FOREIGN PATENTS

| Number | Country | Date |
| --- | --- | --- |
| 282,580 | England | Dec. 29, 1927 |
| 326,833 | Italy | June 22, 1935 |